United States Patent [19]

Vaughn et al.

[11] Patent Number: 4,747,957
[45] Date of Patent: May 31, 1988

[54] BRINE TREATMENT USING ETHYLENE CARBOXYLIC ACID POLYMERS

[75] Inventors: Walter L. Vaughn, Lake Jackson; Harry S. Burney, Clute; Robert D. Spradling, Lake Jackson, all of Tex.; Robert R. Frable, Midland, Mich.

[73] Assignee: The Dow Chemical Company, Midland, Mich.

[21] Appl. No.: 776,346

[22] Filed: Sep. 16, 1985

[51] Int. Cl.$^4$ .................................................. C02F 1/42
[52] U.S. Cl. .................................... 210/687; 204/98; 423/157
[58] Field of Search ................... 210/687; 423/157; 204/98

[56] References Cited

U.S. PATENT DOCUMENTS

| | | | |
|---|---|---|---|
| 3,493,498 | 2/1970 | Abrams et al. | 210/687 |
| 4,078,978 | 3/1978 | Zirngiebl | 204/98 |
| 4,083,782 | 4/1978 | Kunin | 210/687 |
| 4,120,653 | 10/1978 | Smolka | 210/687 |
| 4,448,693 | 5/1984 | Kiehling et al. | 210/687 |

OTHER PUBLICATIONS

Kunin, Robert; *Ion Exchange Resins*, Rohmand Haas Company, Philadelphia, Pa., 1972, pp. 47, 69 and 91.
Dorfner, Konrad; *Ion Exchangers, Properties and Applications*, 1972; pp. 36 and 37.

*Primary Examiner*—Ernest G. Therkorn
*Attorney, Agent, or Firm*—W. J. Lee

[57] ABSTRACT

Hardness values ($Ca^{++}$ and $Mg^{++}$) and other polyvalent metal cations are removed from alkali metal brines (esp. NaCl) by using a high surface area ethylene/carboxylic acid polymer (esp. porous ethylene/acrylic acid copolymers).

18 Claims, No Drawings

BRINE TREATMENT USING ETHYLENE CARBOXYLIC ACID POLYMERS

FIELD OF THE INVENTION

Alkaline earth metal ions (hardness values) are removed from alkali metal brine using particulate or fibrous ethylenic polymers containing carboxylic acid groups in their molecular structure, which have ion exchange capabilities.

BACKGROUND OF THE INVENTION

There is a need remove hardness values, especially $Mg^{++}$ and $Ca^{++}$, from brines, especially NaCl solutions, where such brine is intended for uses in which the hardness values are detrimental. One notable use of NaCl brines is that wherein the brine is used as an electrolyte, e.g., as a feed material to an electrolysis cell, such as a chlorate cell or a chlor-alkali cell. Other brines include LiCl solutions, KCl solutions and other alkali metal brines.

The use of chelating-type ion exchange resins for removing hardness values from brine is disclosed, for example, in U.S. Pat. Nos. 4,060,465 and 4,119,508. Other patents disclosing brine treatment are, e.g., U.S. Pat. Nos. 4,405,574; 4,405,576; 4,415,678; and 4,415,677.

Ethylene polymerized with unsaturated organic carboxylic acids, e.g., acrylic acid, to form copolymers is taught, e.g., in U.S. Pat. Nos. 2,391,218; 3,520,861 and 4,351,931. Copolymers of ethylene and such acids can be made by grafting the acid onto polyethylene, by batch or continuous polymerization of mixtures of monomers of ethylene and the acid, by polymerization of mixtures of monomers of ethylene and the acid in a tubular reactor, and by hydrolysis of copolymers of ethylene/alkyl acrylates which converts the ester groups to carboxylic acid groups. Also, block copolymers can be made whereby chain segments of polyacrylic acid and chain segments of polyethylene form long polymer chains. Any of these known ethylene/acid copolymers are at least somewhat usable in the present invention, so long as they can be formed into solid particles, fibers or filaments. Thus, the purview of the present disclosure includes ethylenic polymers containing a plurality of carboxylic acid groups in their molecular structure, especially the homogeneous, compositionally uniform, random copolymers such as prepared in accordance with U.S. Pat. Nos. 3,520,861 and 4,351,931.

U.S. Pat. No. 3,801,551 is closely related in subject matter to the present invention, since it shows preparation of ethylene/unsaturated carboxylic acid copolymer (ECA) fibers; also U.S. Pat. Nos. 3,790,521 and 3,798,194 are related subject matter. Each discloses treatment of ethylenic polymers containing carboxylic acid groups with an alkaline material in order to obtain certain results, such as the making of fibers, non-colloidal particles, or colloidal particles by digesting particles of the polymers in an alkaline material, followed by shearing.

It has been more recently discovered that there are unexpected improvements resulting from a change in the known process of forming fibers of polymers such as ethylene/carboxylic acid copolymers (ECA), said known process being that of digesting particles of the polymer in alkaline material and then subjecting the so-treated polymer to shearing forces to cause fibrillation or particulation of the polymer particles. The said change in the process involves, as the principal distinguishing feature, the orientation (i.e. "stretching") of the polymer (before treating with a reagent) at a temperature below that at which stress-relaxation of the stretched polymer molecules is substantially encountered; this may be referred to as "cold-stretching" or "crystalline orientation".

It is customary, in some production processes, for polymers leaving a polymerization vessel to be melt-extruded through a die as strands, which are chopped into pellets and cooled in a water bath. U.S. Pat. No. 3,801,551 discloses that such pellets may then be digested in alkaline material and then fibrillated using shearing forces. Since the strands are cut into pellets before the strands have cooled to the point at which crystallization occurs, the stress relaxation of the polymer molecules permits intertwining of the molecules. When such pellets are treated in accordance with U.S. Pat. No. 3,801,551 to prepare fibers, the fibers are relatively short and have very little porosity, if any. Polymers produced as small particles may also be melted, extruded as strands, and chopped into pellets before the intended end-use.

It has been found that if the extruded strands of polymer are allowed to cool to an extent, and for a time, sufficient to allow an appreciable amount of crystallization to occur and are then cold-stretched (oriented), the crystallized molecules become substantially untwined and become substantially aligned in parallel relationship with the direction of orientation. This also draws the strands to narrower dimensions. Since the polymer, when oriented, is cold enough for the molecules to be crystallized, and not warm enough to allow stress-relaxation of the molecules, then the molecules remain dimensionally stable after the orientation is completed. When these oriented strands are treated with a reagent (e.g. 0.5N NaOH) and subjected to shearing or crushing, the strands undergo fibrillation into fibers which are extensively porous. Most of the pores are small enough to be considered micropores. These micropores permeate the length and breadth of the fibers. Even if the oriented strands are chopped into pellets before being treated with alkali and subjected to shearing or crushing, the so-formed fibers are extensively porous and are longer than fibers prepared from pellets of the same dimensions treated in accordance with U.S. Pat. No. 3,801,551.

This same phenomenon is observed when cold oriented films or strips are treated with alkali and sheared or crushed into fibers, and to a greater degree than when using films which are stretched at high temperatures where stress relaxation of the polymer molecules is possible. These recently discovered highly porous fibers and particles are the subject of co-filed patent application Ser. No. 776,534, filed on even date herewith. These highly porous fibers and/or particles are especially preferred due to their high efficiency in scavenging metal ions.

SUMMARY OF THE INVENTION

Alkaline earth metal values, and other polyvalent metal cations, are substantially removed from alkali metal halide aqueous solutions by using, as the polyvalent metal cation scavengers, fibrous or particulate ethylenic polymers containing pendant carboxylic acid groups in their molecular structure, especially where the said fibrous or particulate polymers are porous.

DETAILED DESCRIPTIONS

Throughout this disclosure, alkaline earth metals are those of Groups IIA of the Periodic Table of the Elements, especially Mg and Ca. The alkali metals are those of Group I, especially Li, Na, and K, most especially Na.

For purposes of conciseness herein, the ethylenic polymers containing carboxylic acid groups are referred to as ethylene-carboxylic acid (ECA) polymers. This includes those made by grafting techniques, by block copolymerization, by random interpolymerization in tubular reactors or in batch reactors, but is especially directed to compositionally uniform, random, homogeneous copolymers such as prepared in a constant environment in a stirred autoclave, such as in accordance with U.S. Pat. Nos. 3,520,861 and 4,351,931. The carboxylic acid groups in the ECA polymers may be provided by way of unsaturated carboxylic acids which are copolymerizable with ethylene, such as acrylic acid, methacrylic acid, butenoic acid, crotonic acid, maleic acid, itaconic acid, fumaric acid, and the like. The term "ethylenic polymers" is used here to express the polymeric chain which includes the carboxylic acid groups as side-groups. Aside from the ethylene and carboxylic acids which constitute the major portion of the ECA polymers, there may also be a minor amount of other monomeric or reactive materials included in the polymer, such as higher olefins having from 3 to about 12 carbon atoms, telogens, chain regulators, or organic crosslinking agents. Furthermore, there may be more than one of the said "other" materials and there may be more than one of the carboxylic acids. The polymer which is subjected to the orientation and fibrillation process may be a blend of polymers, so long as there is enough of the carboxylic acid groups in the total blend to provide the amount needed for the fibrillation process. Ethylene/acrylic acid copolymers (EAA) and ethylene/methacrylic acid copolymers (EMAA) are especially preferred.

The amount of carboxylic acid groups in the ethylenic polymers should be at least about 1 millequivalents (meq.) per gram of the ECA polymer, preferably at least about 1.5 meq., most preferably about 2 to about 4 meq. At below about 1 meq. there are generally not enough carboxylic acid groups to efficiently provide the effect desired by the treatment with the alkaline material which produces the ability to fibrillate under shear. At above about 5 meq. there may be an overabundance of carboxylic, acid groups which can lead to excessive fragmentation of the polymer molecules during treatment with the alkaline material, followed by shearing; or in some cases an overabundance of carboxylic groups can cause the ECA to perform somewhat like a homopolymer of the acid and undergo substantial dissolution in a strong alkaline solution.

The molecular weight of the ECA for use in making fibers from cold-stretched strands or sheets may vary over a broad range, as indicated by measurement using the procedure of ASTM D-1238 which measures the melt flow rate value at a given temperature through a prescribed orifice under the pressure of a prescribed weight. This melt flow rate value (MFR) is sometimes called melt index (M.I.). An MFR value in the range of about 5g/10 min. to about 3000g/10 min. is generally operable, preferably in the range of about 15g/10 min. to about 1500g/10 min., most preferably about 15g/10 min. to about 500g/10 min.

These ECA polymers, especially the microporous fibers, may be used in the dual role of filter (to filter out solids), and ion exchanger (to take up soluble polyvalent metals) when made into appropriate arrays as woven, non-woven, sintered, knitted or other suitable articles.

Whereas virtually any alkali metal brine may be substantially cleansed of "hardness" ions and other polyvalent metal cations, within the purview of the present invention, there is a particular brine, NaCl, which is especially in need of purification; this particular brine is used as cell feed to an electrolytic process wherein a NaCl electrolyte is electrolytically decomposed to produce NaOH and $H_2$ at the cathode and $Cl_2$ at the anode. The discussions and examples which follow deal, in particular, with the preferred NaCl brine, though various other brines would be expected to be applicable for their various purposes.

In carrying out the present invention, the aqueous brine is contacted with high surface area (at least about $2m^2/gm$.) ECA polymers (esp. EAA or EMAA). The ECA may be in the form of particles, e.g., powders, chopped fibers or small beads, especially when fashioned into forms which are readily separated from the brine. Ambient temperatures are suitable, though subambient or super-ambient temperatures may be used, so long as the brine is in liquid form (not frozen or gelled and not above boiling). Also, temperatures below the melting or fusion point of the ECA polymer should be used.

The contacting may be done by passing the brine through a stationary array of the ECA polymer particles, or by mixing the particles into the brine, then filtering out the particles or decanting the brine from the particles.

In contradistinction to previous commercially-available chelating-type resins and ion-exchange beads, which generally are useful only at certain pH's, the ECA polymers are effective at acid and basic pH's and are not expensive. Many ion-exchange beads are not effective in removing $Ca^{++}$ or $Mg^{++}$ from saturated NaCl, KCl, or LiCl solutions.

These ECA polymers are regenerated to get back to the active —COOH groups by using a mineral acid (especially HCl) to remove the polyvalent metal ions which the polymers have removed from brine. The regeneration efficiency is sufficiently high to obtain numerous loading/unloading cycles.

A typical operation for using ECA to purify NaCl brine would involve 10°-60° C., a raw brine hardness concentration of 0.5 to 500 ppm (as $Ca^{++}$), a space velocity of 0.5–50/hour through a column containing the ECA particles, and a brine feed pH in the range of 3–13.

The examples which follow are for illustration, but the invention is not limited to the particular illustrations shown.

EXAMPLE 1. (FIBER PREPARATION)

An ethylene-acrylic acid (20% AA/80% E, 300 MFR) in the form of granules was combined with 0.5N NaOH at a molar ratio of 0.4 NaOH/1.0 AA. The mixture was heated at 50° C. overnight to swell the granules. The granules roughly doubled in volume and became soft and white. The excess liquids were drained off and replaced with deionized water. The mixture was placed in a Waring blender and fibrillated (blended) for 6 minutes to obtain a 20–40 mesh fiber size. The mass of fibers was acidified with 0.1N HCl to a pH of 4, then filtered and water washed on a coarse frit filter. The fibers were vacuum-dried at room temp. (drying temperature below 60° C. to prevent sintering of fibers). These fibers were screened to collect 20-40 mesh fraction and larger fibers were recycled to the NaOH swelling steps (all EAA was obtained as fibers by this method).

EXAMPLE 2.(BRINE TREATMENT)

A sample of filtered saturated NaCl alkaline brine (pH 11.3) was obtained. This brine had undergone conventional treatment to prepare it for use as diaphragm chlor-alkali cell feed. This brine was analyzed for hardness and found to contain approximately 1.51 ppm hardness as $Ca^{++}$. A 425 ml sample of this brine was added to a plastic beaker which already contained 250 ml dry volume of EAA fibers. The EAA fibers were made from a thermoplastic EAA copolymer which was approximately 20% acrylic acid. It was in the form of 20-40 mesh size fibers and had a surface area of approximately 5 $m^2/g$. A magnetic stirring bar (Teflon coated) was put in the beaker containing the brine and EAA fibers. The beaker was covered and left stirring on a magnetic stirrer for 21 hours. Most of the EAA fibers floated near the surface of the brine, but the agitation of the magnetic stirring bar drew down enough of the fibers throughout the brine to make the mixture cloudy and almost opaque.

After 21 hours of mixing, the brine/fiber mixture was poured into a 500 ml separatory funnel in order to get a bulk separation of the solid and liquid phases (most of the solid fibers floated to the surface of the brine). The liquid phase (brine) was drawn out through the bottom of the separatory funnel and filtered through Whatman 41 ashless filter paper to remove the remaining fibers. This EAA treated brine was analyzed for hardness and found to contain approximately 0.059 ppm hardness as $Ca^{++}$.

EXAMPLE 3. FIBER REGENERATION

Expended fibers are placed in a bed (if not already in a bed). D.I. water is passed thru the bed. About two bed volumes of concentrated HCl regenerate the bed to the EAA form by ion exchange. The bed is washed free of HCl with D.I. water and is ready for reuse in brine treatment.

EXAMPLE 4. BRINE PURIFICATION BY COLUMN TREATMENT

In order to compare EAA fibers with a commercially available ion exchange resin, and to show tandem use of the two, the following experiment was made:

Using a Masterflex variable speed pump, a concentrated brine feed (24% by wt. of NaCl) containing 1250 ppb hardness (as $Ca^{++}$) was passed through a 20" column (having a length/diameter ratio of about 40) of AMBERLITE IRC-718 Ion Exchange Beads (from Rohm & Haas) at a flow rate of 20 ml/min., which is 12 BVH (bed volumes per hour), to give a contact time of 5 minutes. A plurality of these runs was made to gather data over a range and compute the average.

A portion of EAA fibers, such as Example 1 above, was placed in a column and used in similar manner as described above. Also, as in similar manner as described above, a portion of the brine was passed first through 20" of the commercial Ion Exchange Beads and then through a polishing step of 20" of the EAA fibers.

Chemical analysis was made for hardness after treatment. The data are shown below:

| Treating Agent* | $Ca^{++}$ In Brine After Treatment (ppb)*** | |
|---|---|---|
| | Range | Average |
| 20" of A* | 20-27 | 22 |
| 20" of B** | 4-9 | 6 |
| 20" of A/20" of B | 5-7 | 6 |

*A is commercially available AMBERLITE IRC-718 weak acid exchange beads having carboxylic functionality (iminodiacetic acid) of the empirical formula

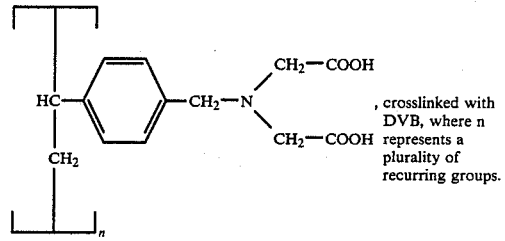

, crosslinked with DVB, where n represents a plurality of recurring groups.

B is an EAA copolymer fiber as in Example 1 above.
***the analyses are approximations at the lower values since the analytical technique is not as sensitive at about 10 ppb and less.

This example is used to demonstrate that one may use an ordinary ion exchange bead to do a "rough" clean-up of the brine, then use the present EAA fibers in a "polishing" step. The EAA in the polishing step can be used in many change-outs of the ion exchange beads and will catch the "break-through" hardness values that escape through fully loaded ion exchange beads. A concentrated NaCl brine, having hardness values reduced to 10 ppb (measured as $Ca^{++}$) is ideally suited for use as a brine feed for an electrolytic chlor-alkali cell where $Cl_2$ and NaOH are produced and where fouling of the cell membrane or diaphragm by hardness values is detrimental.

We claim:
1. A method for removing alkaline earth metal values from an alkali metal salt brine, said method comprising
   intimately contacting said brine with microporous ethylene acrylic acid interpolymer fibers having a surface area of least about 2$m^2$/gm, said acrylic acid moiety comprising at least about 1 meq., but not more than 5 meq., per gram of said copolymer, and
   separating said copolymer from said brine, thereby substantially removing alkaline earth metal values from said brine.
2. The method of claim 1 wherein the brine comprises an aqueous solution of NaCl, KCl, or LiCl.
3. The method of claim 1 wherein the brine comprises an aqueous solution of NaCl.
4. The method of claim 1 wherein the brine comprises a concentrated aqueous solution of NaCl.
5. The method of claim 1 wherein the brine comprises a saturated aqueous solution of NaCl.
6. The method of claim 1 wherein the brine comprises a cell feed brine in a chlor-alkali electrolytic cell.
7. The method of claim 1 wherein the brine being contacted with the copolymer is one which has already had much of the hardness values already removed in a previous hardness-removal process.
8. The method of claim 7 wherein the said previous hardness-removal process comprises
   contacting the alkali metal salt brine, which contains hardness values, with ordinary ion exchange beads which remove most of the hardness values.

9. The method of claim 1 wherein the said carboxylic acid comprises at least about 1.5 meq., but not more than 5 meq., per gram of said copolymer.

10. The method of claim 1 wherein the said carboxylic acid comprises from about 2 meq. to about 4 meq. per gram of said copolymer.

11. A method for removing alkaline earth metal values from an alkali metal salt brine, said method comprising intimately contacting said brine with ion exchange beads which remove most of the hardness values, then intimately contacting said brine with microporous ethylene/acrylic acid interpolymer fibers having a surface area of at least about $2m^2/gm$, said carboxylic acid moiety comprising at least about 1 meq., but not more than 5 meq., per gram of said copolymer, thereby further removing hardness values from the brine, and separating said copolymer from said brine.

12. The method of claim 11 wherein the brine comprises an aqueous solution of NaCl, KCl, or LiCl.

13. The method of claim 11 wherein the brine comprises an aqueous solution of NaCl.

14. The method of claim 11 wherein the brine comprises a concentrated aqueous solution of NaCl.

15. The method of claim 11 wherein the brine comprises a saturated aqueous solution of NaCl.

16. The method of claim 11 wherein the brine comprises a cell feed brine in a chlor-alkali electrolytic cell.

17. The method of claim 11 wherein the said carboxylic acid comprises at least 1.5 meq., but not more than 5 meq., per gram of said copolymer.

18. The method of claim 11 wherein the said carboxylic acid comprises from about 2 meq. to about 4 meq. per gram of said copolymer.

* * * * *